May 30, 1944.   E. E. SIMMONS, JR   2,350,073
STRAIN GAUGE AND METHOD FOR MAKING SAME
Filed May 8, 1942    2 Sheets-Sheet 1

INVENTOR
EDWARD E. SIMMONS JR.
BY
ATTORNEY

May 30, 1944.  E. E. SIMMONS, JR  2,350,073
STRAIN GAUGE AND METHOD FOR MAKING SAME
Filed May 8, 1942   2 Sheets-Sheet 2
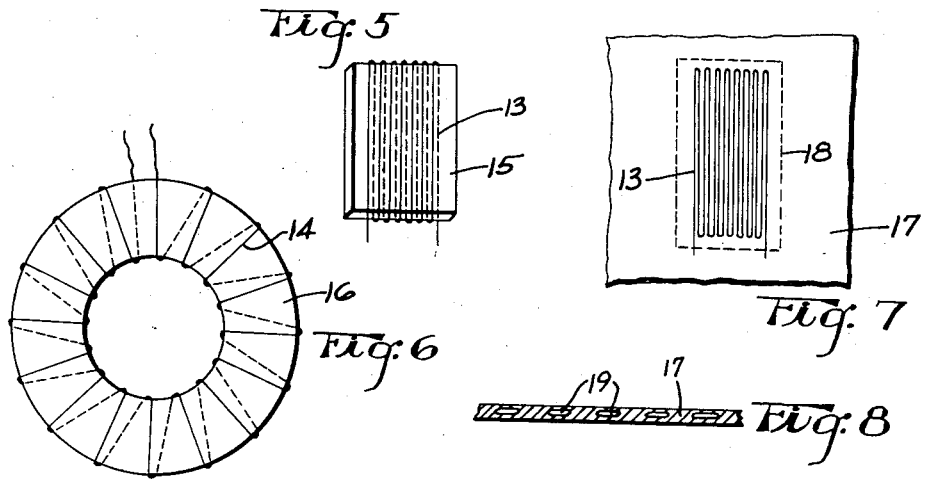
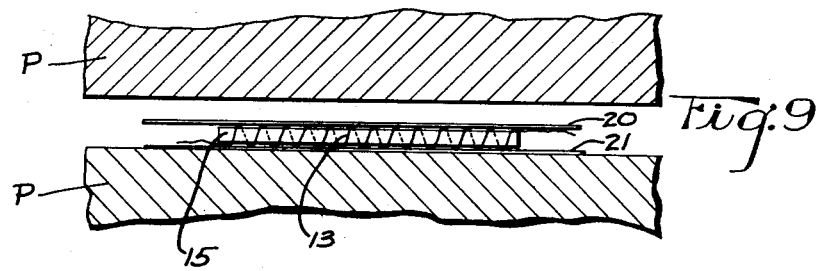
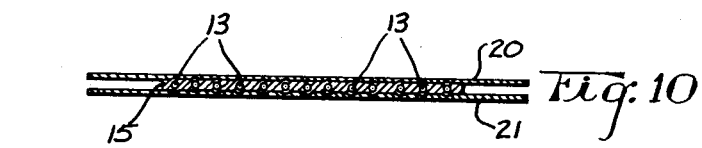
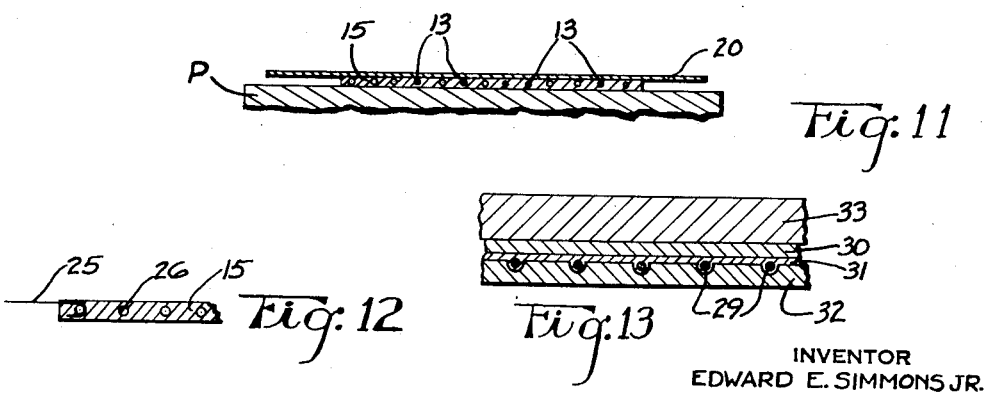
INVENTOR
EDWARD E. SIMMONS JR.
BY
ATTORNEY Patented May 30, 1944

2,350,073

UNITED STATES PATENT OFFICE 2,350,073

STRAIN GAUGE AND METHOD FOR MAKING SAME

Edward E. Simmons, Jr., Pasadena, Calif.

Application May 8, 1942, Serial No. 442,159

5 Claims. (Cl. 201—63)

This invention relates to an improved strain gauge and method of making the same, the strain gauge being particularly of the type having a fine wire electrical resistance element adapted to be bonded throughout its effective length to a member subject to strain whereby variations in strain of the member causes a predetermined resistance change in the fine wire element.

The character of the filament wire and the materials of which it may be made, among possible others, are fully described in my copending application Serial No. 320,327, filed February 23, 1940, now Patent No. 2,292,549, issued August 11, 1942, and hence it is not necessary to describe this wire in the present application except to point out that the wire is a continuous solid metallic filament whose diameter is preferably of the approximate order of .001 to .003", although the wire may be finer under certain circumstances. In any event the hair-like character of the wire renders it somewhat difficult to arrange and support the wire in such a form that the completed gauge can be conveniently handled and applied to a test member while at the same time having the supporting medium of the gauge sufficiently thin to insure that the filament lies closely adjacent to the surface of the test member.

It is an object of my invention to provide an improved gauge of the foregoing type and an improved method for making the same whereby the gauge has the necessary degree of thinness and can be formed relatively easily and economically with precision.

Another object is to provide an improved gauge that may be adhesively bonded throughout its effective length to a test member in a simple, expeditious and satisfactory manner.

A further object is to provide an improved gauge adapted to be applied in an improved manner to the surface of a test member and, if desired, to be readily removed therefrom.

Other objects and advantages will be more apparent to those skilled in the art from the following description of the accompanying drawings in which.

Figure 4:
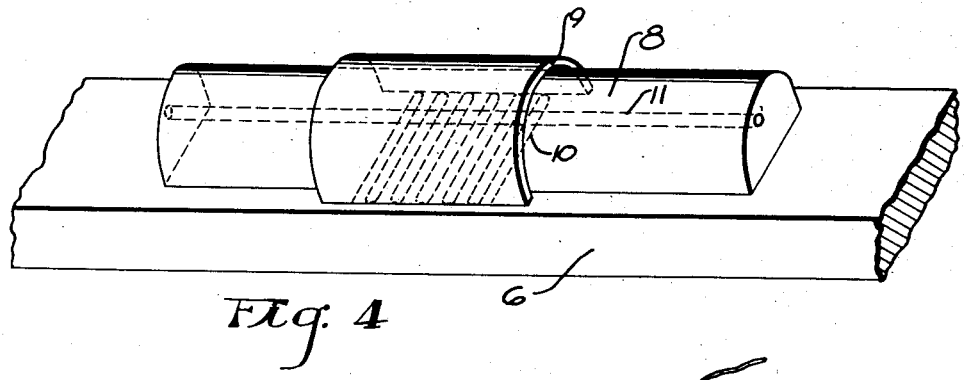
Figure 3:
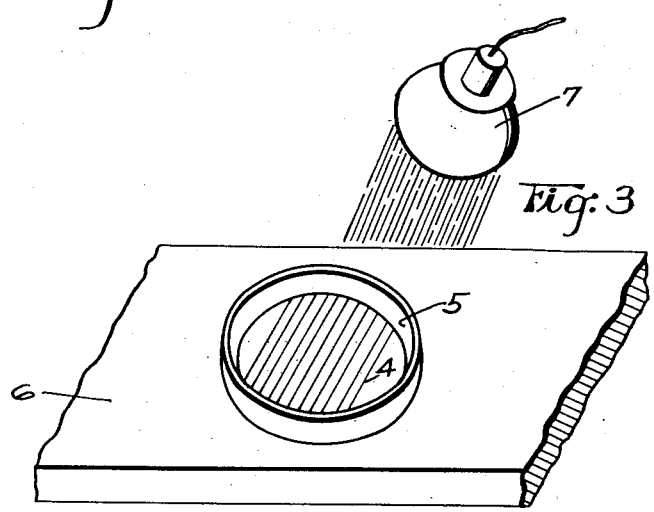
Fig. 3 is a diagrammatic perspective showing a radiating heater for applying my improved gauge to the test surface and also showing one form of my gauge with a bow supporting means.

Fig. 4 diagrammatically illustrates a filament type heating lamp adapted, if desired, to be used in applying my improved type of gauge;

Fig. 5 shows one method by which my improved gauge can be formed in a flat, rectangular form;

Fig. 6 shows a method by which the gauge may be wound on an annular support;

Fig. 7 shows a further step in the process of manufacturing the gauge of Fig. 5 after it has been subjected to pressure and heat;

Fig. 8 is an enlarged fragmentary section of a gauge showing the manner in which the gauge filament may be partially flattened to a ribbon-like form if sufficient pressure is applied during manufacture;

Fig. 9 is a diagrammatic illustration showing a further method and arrangement for embedding the filament into its thermal plastic support together with providing external membranes for the gauge;

Fig. 10 is a transverse section through a gauge formed in accordance with the method of Fig. 9;

Fig. 11 is a further modified form of the gauge employing a removable membrane which is temporarily used during the pressing operation;

Fig. 12 is an enlarged fragmentary sectional view of the gauge showing the manner of connecting a lead to the filament; and Fig. 13 is a sectional view showing a further method of forming any modified form of gauge.

Figures 1, 2:
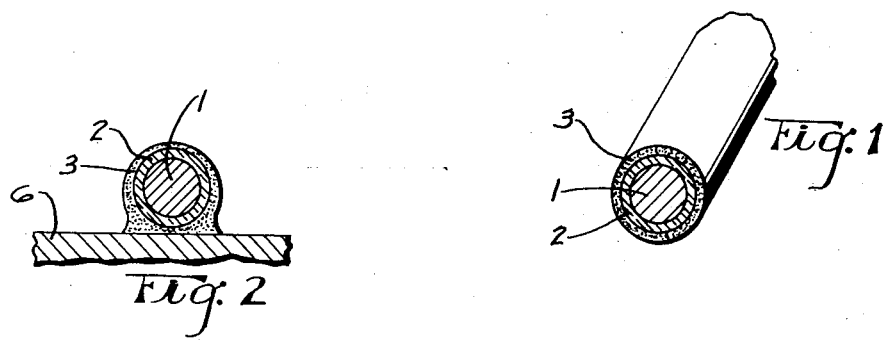
Fig. 1 is a greatly enlarged cross-sectional perspective of one form of gauge filament embodying my invention before being applied to a test member.
Fig. 2 is a greatly enlarged cross-sectional view of my improved gauge applied to the surface of a test member.

In the particular embodiments of the invention that are shown herein for the purpose of illustrating certain specific forms thereof, I have provided, as shown in Figs. 1 and 2, a wire filament 1 of the type above referred to having an insulating layer 2 which, in turn, is coated with a thermal softening cement or bonding layer 3 throughout the effective length of the gauge. The insulating layer may be any usual wire enamel or silk thread covering while the cementing or bonding layer 3 consists of a thermal softening cement which by way of example and among many other possible types of thermal softening cements is specifically shown herein as an adhesive known as "XL 5075" manufactured by Carbide and Carbon Chemicals Corporation. After a suitable length of the filament is enameled and coated with the thermal softening material the filament readily lends itself to use as an open type strain gauge both in fabrication and application all as disclosed more fully in my copending application Serial No. 403,717, filed July 23, 1941. As disclosed in said latter application the filament may be attached to a suitable supporting frame and the insulating enamel applied by dipping and baking following which hot bonding or cementing layer is applied by similar dipping and hardening. The filament may be employed as an open type strand as above mentioned or, if desired, it may be wound back and forth in parallel loops 4 on a suitable frame which is specifically shown as of an annular type 5. Regardless of how the open type filament may be supported at its ends it is pressed against the strain subject member 6 in a desired position and heat is applied until the cement layer softens and bonds the filament to the surface of test member 6, the cement becoming hard when it cools which requires a very short interval of time compared to the hardening of a volatile solvent type cement as heretofore used. The insulating layer 2 is impervious to heat and serves to insulate the filament from the member in case the cement softens sufficiently to allow the insulated layer to come into contact with the test specimen. The cement may be softened by heating from an open gas flame if desired, although a radiating heater 7 is preferable such as a filament type reflector heat lamp 8, Fig. 4, may be used. The gauge in this arrangement is of the type having an arched flexible frame 9 with a filament 10 wound back and forth across the open end of the frame. The heating element 8 may be of such size as to be inserted within the support 9 so as to overlie the filament 10. The heating element is diagrammatically shown at 11. This method provides a very rapid means of attaching gauges to test members as the usual time of drying a volatile solvent cement is avoided. My improved gauge and method of forming the same insures just the right amount of cement on the filament and thereby avoids the trouble of excess cement which if present may be unevenly distributed. The cement in this present modification is right where it is needed.

The broad principle of the above described duplex coated wire filament employing a thermal plastic bonding element is essentially used in the modification of Figs. 5 to 12. The principal feature of this form of gauge is that the filament 13 is wound in a pre-formed member made of thermal plastic material of which there are a great many well-known types on the market one of which is said "XL 5075." Subsequent to this winding operation the thermal plastic material and winding are placed as an assembled unit in a hot plate press between platens P and compressed to form a thin wafer with the filament embodied therein. For example, Figs. 5 and 6 show possible winding forms of suitable thermal plastic material upon which the filaments 13 and 14 are wound. The filament 13 is wound initially upon a relatively thick sheet of thermal plastic material of substantially rectangular form 15 while the filament 14 is wound upon an annular sheet 16. These forms may be of sufficient thickness to make handling feasible, such for example as of the approximate order of $\frac{1}{16}$". After the forms are wound they are pressed between usual parallel platens of a press with application of heat to squash the plastic material into a very thin sheet 17. Fig. 7, the filament being forced to be embedded therein. The excess flash is trimmed off along the dotted outline 18 after removal from the press. If desired, extreme pressures and hard faced press plates may be employed so as to flatten the filament strands into ribbon form as diagrammatically indicated at 19, Fig. 8. Since the use of strongly adhesive plastic materials may give trouble in adhesion to the press plates, I may, if desired, employ thin membranes 20 and 21 placed over the wound form of Fig. 5 or 6 so as to form a barrier between the press plates and the plastic material 15 or 16. These membranes are then bonded to the plastic material and then become part of the gauge structure when the plastic material is squeezed as shown in Fig. 10. The membrane may be of suitable insulating material such as thin paper which serves as insulating means and this paper may be bonded to a test member by a thin layer of said thermal softening cement. In case it is not desired to have the membranes form part of the finished gauge the membrane may be formed of metal foil which is removable by chemical etching after the pressing operation. Membrane material suitable for this purpose is aluminum, tin, silver, etc. This process is particularly useful when it is desired to be able to directly thermally bond the gauge to a test member. In this case the filament wire is not only pre-insulated as by enamel or silk covering material but is also embedded in a strongly adhesive film of thermal plastic bonding cement like "XL 5075" which may be softened so as to adhere to the surface of the test member throughout the length of the filament. In the application of the gauge to a test surface suitable pressure is applied as by pressing down on the plastic medium, throughout the filament length, with a suitable block of wood or metal or a pallet knife, these being applied immediately after the heating source has been removed. In this connection one pressing membrane, such as 20, may be non-etchable such as paper so that no particular care will have to be exercised when etching off the single metallic membrane. The metallic membrane left on the plastic filament carrier will, of course, be placed on top when the gauge is bonded to the test specimen thereby preventing the pallet knife or pressure block from adhering to the plastic material during application of the gauge to the specimen. If desired, terminal leads 25 may be attached to filament 26 by bending a loop of the lead around the filament. This loop would be cold bonded to the filament during the pressing operation of Fig. 9, the cold bonding operation being particularly effective for metals such as lead, silver and gold.

The principle herein broadly disclosed is also applicable to gauges of the type shown in my said copending application wherein a filament is bonded to a piece of paper to form a gauge unit. Heretofore this unit has been bonded to a test surface by a solvent type cement applied in wet form but considerable time was normally required to allow the cement to harden by evaporation of the solvent. However, in my improved device a layer of thermal plastic cement material may be spread and hardened on the under surface of the paper gauge unit to form an integral part thereof and then attachment of the unit to the test surface is made by simultaneously heating and applying pressure to the gauge on the test surface so as to soften the hardened thermal plastic material whereupon its subsequent rehardening bonds the gauge to the test surface. If the thermal plastic cement material is "Duco Household Cement" the gauge may be applied by application of heat and pressure as just described or, if desired, the gauge may be attached by applying a cement solvent to the test member and placing the gauge over the solvent layer to produce adhesion through resolution of the cement and subsequent drying. In this manner the cement is an integral part of the gauge unit applied thereto at the time of gauge manufacture so that the use can quickly apply the relatively thin solvent to the test surface. On the other hand, the same gauge lends itself to attachment by use of heat and pressure if the user prefers this method. String gauges of the type shown in Figs. 1 and 2 as well as any other open type gauge could be attached either by application of heat and pressure or by placing the open gauge filament in contact with the test member and then spraying or brushing the solvent over the open filament structure to produce adhesion by resolution and drying of the solvent cement such as "Duco Household Cement" which was applied as a second or duplex layer over the impervious insulating layer on the gauge filament. That is, the insulating layer and duplex adhesion layer would form a part of the original filament structure. A further arrangement along these lines consists of attaching the filament 29 to a thin sheet of mica 30 with an irreversible baking cement 31, such as Bakelite, which in turn, is covered with either a thermal plastic bonding material 32 or a solvent bonding cement. The back of the mica sheet is permanently cemented to a stiff metallic washer 33 for ease in handling. This unit forms a sandwich which is placed with bonding material 32 against a test member and bonded by heating and pressure. After cooling the heavy backing layer is split off through one of the splitting planes of the mica 30.

While several bonding materials have been mentioned, it is, of course, obvious that there are other equivalent materials insofar as their physical properties are necessary in my present invention. For instance, XL 5075 is a polyvinyl acetate-chloride mixture, but butyl acetate would be equally satisfactory. XL 5075 has the property of irreversibility of heating, that is, once it has been bonded by heating it hardens due to polymerization so that a second heating produces much less softening. Such material is applied to the filament in liquid form through the use of well-known solvents and is dried at sufficiently low baking temperature to evaporate the solvent and form a coating film. For subsequent bonding a higher temperature is applied.

From the foregoing disclosure of the several modifications, it is seen that I have provided an extremely simple and yet highly effective gauge in which the supporting medium for the filament is not only thermally bonded thereto throughout the length of the filament but also serves as a bonding medium which may quickly and easily bond the filament to a test member merely by applying an external source of heat to the thermal plastic medium which will quickly cool so as to harden or set thereby avoiding the usual period required where volatile solvent cements are employed. The thermally effected bond between the filament, plastic material and the test surface is sufficient to transmit strains from the test member to the filament so as to accurately produce a corresponding change in filament resistance and to faithfully repeat alternate test strains. The filaments in all forms may be pre-enameled so that this enamel together with the thermal plastic coating forms broadly a duplex coated filament, although the enamel might be omitted under certain circumstances where there is little danger of the filament contacting the specimen when the thermal plastic material is initially softened during application of the gauge. In addition, the filament may be easily handled during winding and yet it is thoroughly bonded throughout its length to the supporting medium which may be formed into a very thin and flexible strip. The thinness of the gauge is conducive to rapid thermal plastic action during application of the gauge to the test member and is conducive to equal rapidity of cooling and hardening of the plastic material.

It will of course be understood that various changes in details of construction and arrangement of parts may be made by those skilled in the art without departing from the spirit of the invention as set forth in the appended claims.

I claim:

1. A strain gauge comprising, in combination, a continuous solid filament of material whose electrical resistance is adapted to vary with changes of strain therein, and a thermal softening material bonded to said filament throughout its effective length so as to transmit strains to the filament from a test member to which the filament is adapted to be thermally bonded throughout its said effective length.

2. A strain gauge comprising, in combination, a continuous solid filament of material whose electrical resistance is adapted to vary with changes of strain therein, a thermal softening material completely surrounding said filament so that the same is embedded within the thermal material and is bonded thereto throughout the effective length of the filament whereby the filament may be bonded to the surface of a test member by applying heat to the thermal material and allowing the same to cool.

3. A strain gauge comprising, in combination, a continuous solid filament of material whose electrical resistance is adapted to vary with changes of strain therein, a thermal softening material bonded to said filament throughout its effective length so as to transmit strains to the filament from a test member to which the filament is adapted to be thermally bonded throughout its said effective length, and a membrane thermally bonded to said thermal material on at least one side thereof.

4. A strain gauge comprising, in combination, a continuous solid filament of material whose electrical resistance is adapted to vary with changes of strain therein, a thermal softening material bonded to said filament throughout its effective length so as to transmit strains to the filament from a test member to which the filament is adapted to be thermally bonded throughout its said effective length, and an etchable membrane bonded to the outside surface of said thermal material and adapted to be removed by etching to expose the thermal material to permit it to be bonded to the test member.

5. A strain gauge comprising, in combination, a continuous solid filament of material whose electrical resistance is adapted to vary with changes of strain therein, a lead having a cold bond with said filament, and a thermal softening material bonded to said lead and to said filament throughout its effective length so as to transmit strains to the filament from a test member to which the filament is adapted to be thermally bonded throughout its said effective length.

EDWARD E. SIMMONS, Jr.